US007032280B1

(12) United States Patent
Ploeger

(10) Patent No.: US 7,032,280 B1
(45) Date of Patent: Apr. 25, 2006

(54) SINGLE BRAKE SPRING TOOL AND METHOD

(75) Inventor: Randal J. Ploeger, Clarinda, IA (US)

(73) Assignee: The Lisle Corporation, Clarinda, IA (US)

( * ) Notice: Subject to any disclaimer, the term of this patent is extended or adjusted under 35 U.S.C. 154(b) by 0 days.

(21) Appl. No.: 11/143,858

(22) Filed: Jun. 2, 2005

(51) Int. Cl.
*B23P 19/04* (2006.01)

(52) U.S. Cl. .......................................... 29/225; 29/256

(58) Field of Classification Search .................. 29/225, 29/255, 256, 226–229, 238–239
See application file for complete search history.

(56) References Cited

U.S. PATENT DOCUMENTS

| | | | | |
|---|---|---|---|---|
| 1,986,093 | A * | 1/1935 | Abernathy | 81/486 |
| 3,704,503 | A * | 12/1972 | Haywood | 29/256 |
| 6,012,211 | A * | 1/2000 | Ochoa et al. | 29/426.5 |
| 6,044,535 | A | 4/2000 | Strickland | |
| 6,082,793 | A * | 7/2000 | Gagnon | 294/1.1 |
| 6,327,769 | B1 | 12/2001 | Strickland | |
| 6,520,732 | B1 * | 2/2003 | Bull et al. | 414/746.5 |

OTHER PUBLICATIONS

GM Brake Shoe Spanner and Spring Remover, No. J38400, OTC Catalog, p. 70, May 1998.
Brake Spring Pliers, Napa Service Tools, Skin Pack Card from NAPA Part No. 3365.

* cited by examiner

*Primary Examiner*—Lee D. Wilson
(74) *Attorney, Agent, or Firm*—Banner & Witcoff, Ltd.

(57) ABSTRACT

A method for removal and replacement of a generally U-shaped drum brake spring from brake drum shoes includes a tool set of two spring retractors each in the form of an L-shaped bracket with a hook designed to engage a leg of the spring and further including alignment features associated with at least one leg of each spring retractor to assist in positioning the spring retractor on the backing plate of a drum brake assembly. At least two spring retractors are used in combination, each separate retractor being used to engage and remove or replace one leg of a generally U-shaped spring from the brake shoes of a drum brake assembly.

18 Claims, 3 Drawing Sheets

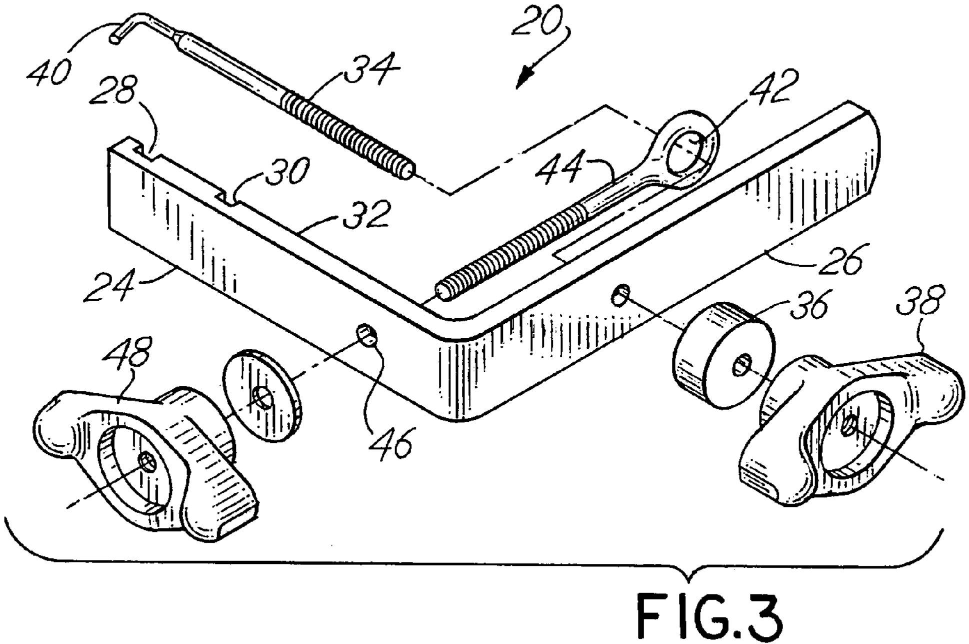
FIG.3
FIG.4
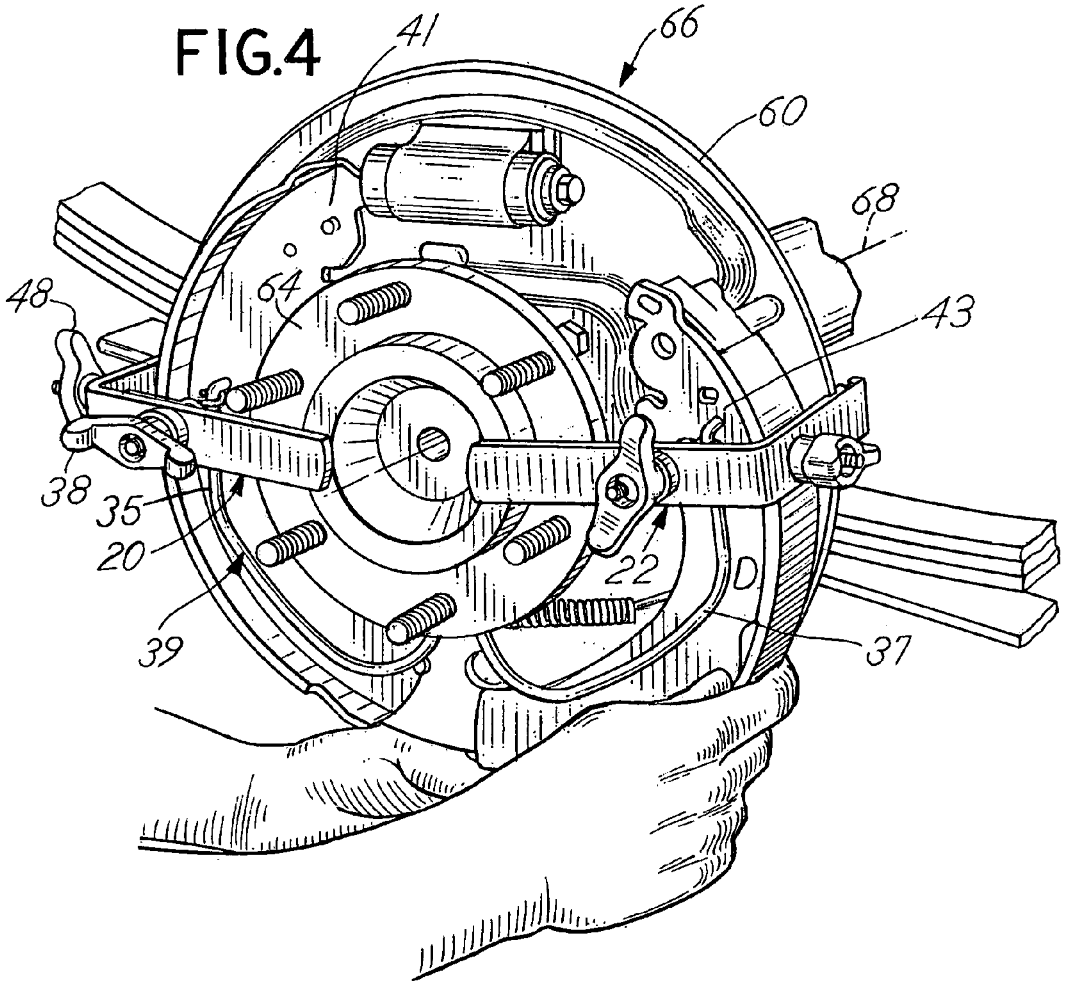

SINGLE BRAKE SPRING TOOL AND METHOD

BACKGROUND OF THE INVENTION

In a principal aspect the present invention relates to a brake repair tool and a method for use thereof for drum brake maintenance. The drum brake system of a vehicle typically includes a brake backing plate upon which a hub and a pair of arcuate brake shoes are mounted. Each brake shoe is typically pivotally mounted at one end and spreadable at their opposite ends so as to engage pads attached on the outside face of the shoes against a brake drum. A brake cylinder thus is connected between the spreadable ends of the shoes and may be expanded to cause them to pivot and spread against the brake drum and effect a braking action. A mechanical spring is typically attached to the shoes which biases the shoes from engagement with the brake drum upon release of the cylinder pressure that causes the brake shoes to spread. In General Motors vehicles, in particular, the mechanical spring is a heavy duty, U-shaped spring having legs attached respectively to first and second brake shoes. The release of the brake cylinder enables the U-shaped spring to bias the brake shoes about their pivot connections and toward one another to be thereby released from engaging the brake drum.

When repairing such a brake assembly, it is desirable to disengage the spring from the brake shoes. Prior art patents teach at least one method and a tool for accomplishing this objective. More specifically, U.S. Pat. No. 6,044,535 and a companion patent, U.S. Pat. No. 6,327,769, each of which is incorporated herewith by reference for a "Brake Spring Maintenance Tool and Method" teach a brake spring tool and the method of use thereof. Such a tool, as depicted in the reference patents, has enjoyed commercial success. A version of such a tool is available from applicant's assignee; namely, Lisle Corporation, Single Spring Brake Tool, Item No. 49900, offered by Lisle Corporation, Clarinda, Iowa. The tool is especially useful with drum brakes used on vehicles manufactured by General Motors Corp.

Unfortunately, with the advent of new car designs, the referenced tool may not be as useful as desired, particularly with respect to larger vehicles such as truck type vehicles. Consequently, there has developed a need for a tool capable of functioning in a manner similar to that disclosed in the aforesaid patents and used generally in accord with the referenced commercial embodiment, but which is capable of more universal application; namely, application with respect to additional vehicles having drum brakes with various spring constructions and spring sizes.

SUMMARY OF THE INVENTION

Briefly, the present invention comprises a brake tool for use on a single spring drum brake and the method of using such a tool to effect removal, replacement and repair of generally U-shaped drum brake springs that bias the engagement and operation of brake drum shoes mounted on a brake backing plate. More specifically, the tool comprises a set of two separate spring retractors which operate in concert in order to effect the removal and replacement of a single generally U-shaped brake spring from engagement with brake drum shoes. Preferably, the spring retractors in the set have a substantially identical construction, but they each may have a distinct construction. Each spring retractor tool generally comprises an L configured bracket member which includes a first leg for engaging the brake backing plate and a second leg extending generally transversely from the first leg for engaging the hub of a drum brake assembly. A retractable hook member is mounted on the second leg for engaging a leg of a U-shaped spring of the brake assembly.

In use, therefore, each spring retractor tool is mounted on the brake backing plate so as to engage a separate one of the U-shaped, spaced legs of the spring. That is, retention elements, such as notches in the first leg, facilitate maintenance of the spring retractors or tools properly positioned on the backing plate. The first legs of each of the spring retractors may include one or more notches which comprise adjustable means for engaging the brake backing plate. A hook member is provided on each second leg for gripping a spring leg. The hook members are adjustable and may be adjusted in a manner to effect release of the leg of the U-shaped spring from the associated brake shoe. Further, each of the spring retractors in the set preferably includes a further means or mechanism to connect an adjustable length connector between the first leg and the hook member. The adjustable length connector facilitates alignment of the hook member with the spring and helps accommodate the desired movement of each spring leg during their removal and replacement of the U-shaped spring from the brake shoes.

In use, first and second separate spring retractors are positioned generally on opposite sides of a brake backing plate in opposed relation so that each one of the retractors may be engaged with a separate one of the legs of a single U shaped brake spring. The spring retractors may thus be used in combination with multiple sizes of brake assemblies having multiple arrangements of the size and disposition of the single U-shaped drum brake spring.

Thus, it is an object of the invention to provide an improved single spring brake tool as well as a method for using such a tool in order to effect repair and/or maintenance of drum brake assemblies.

A further object of the invention is to provide a single U-shaped spring, brake tool and method of use which includes the utilization of at least a pair of separate spring retractors that in combination effect spring removal from and repair of drum brake assemblies.

Another object of the invention is to provide a single spring brake tool and a method of use thereof which has a broader range of use and is thus capable of substantially universal application and repair of single spring, drum brake assemblies.

These and other objects, advantages and features of the invention will be set forth in the detailed description which follows.

BRIEF DESCRIPTION OF THE DRAWING

In the detailed description which follows, reference will be made to the drawing sed of the following figures:

FIG. 3 is an exploded isometric view of the tool of FIG. 1;

FIG. 4 is an isometric view illustrating the manner of use of the tool of FIG. 1.

DESCRIPTION OF THE PREFERRED EMBODIMENT

Figures 1, 2:
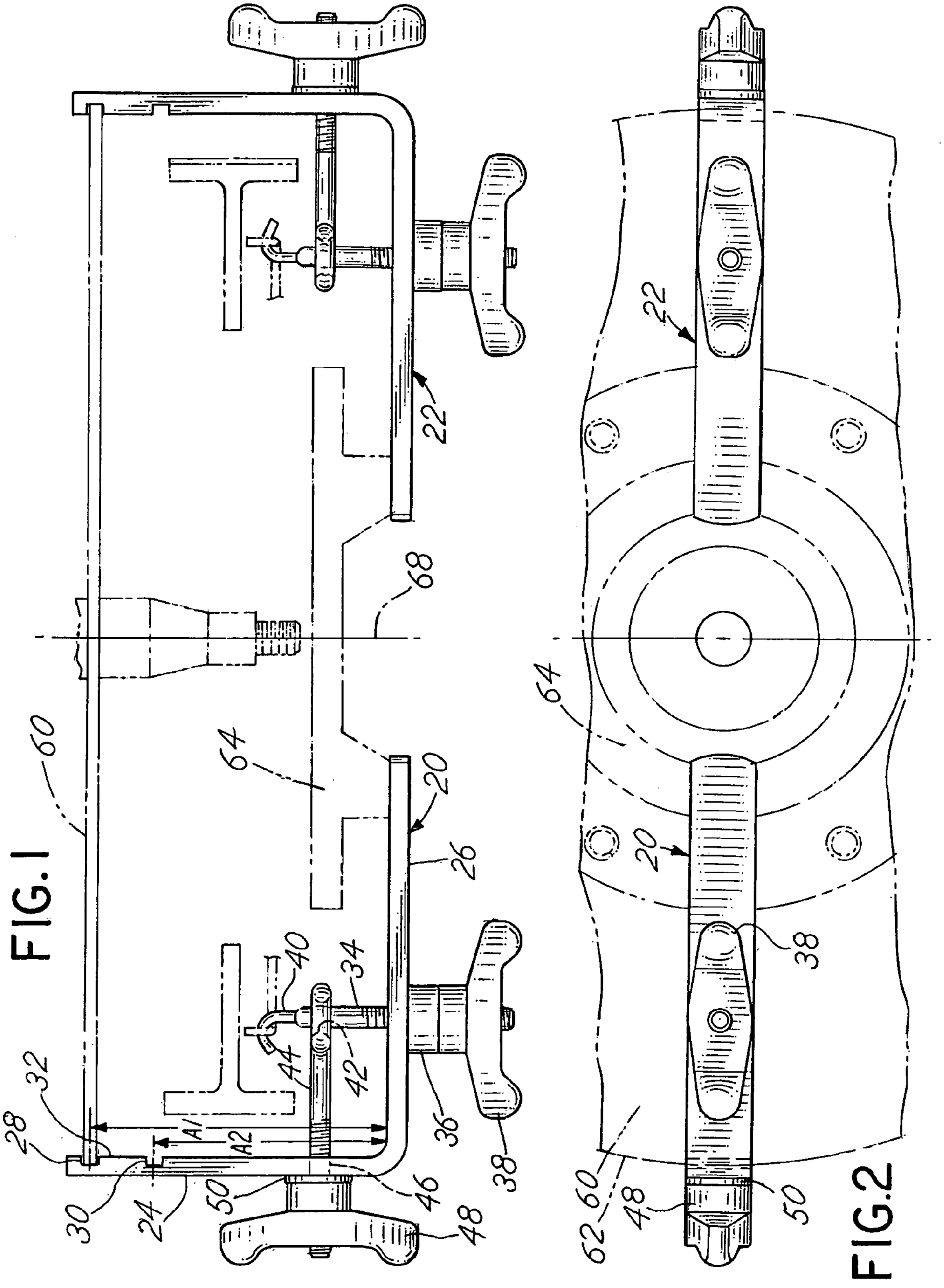
FIG. 1 is a side elevation of the brake spring tool of the invention.
FIG. 2 is a top plan view of the tool of FIG. 1.
Figure 5:
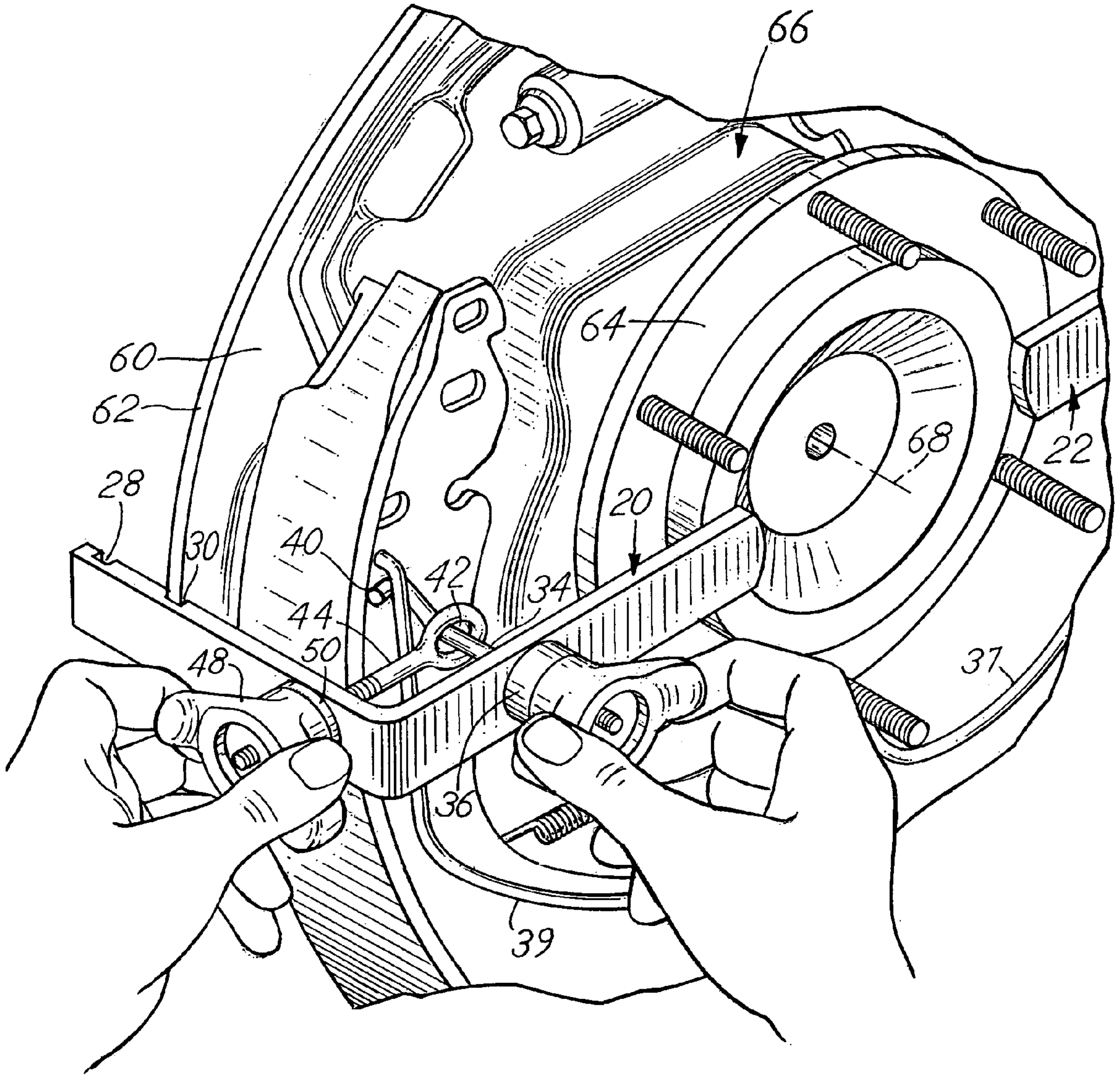
FIG. 5 is a further isometric view illustrating the manner of use of the tool of FIG. 1.

Referring to the figures, the tool of the invention is comprised of a first and a second brake spring retractor which, in combination, comprise a set of brake spring retractors and thus comprise the brake repair tool of the invention. As depicted in FIG. 1, separate spring retractors 20 and 22 are preferably substantially identical. The spring retractors that are used in the practice of the invention, however, need not be identical. Nonetheless, they are desirably constructed in a manner which enables them to be used in combination to effect the practice of the method of the invention. Thus, a description of one of the spring retractors in the set will generally apply to each member of the set.

Each of the separate spring retractors 20 and 22 includes a first leg 24 and a second leg extending generally at a right angle or transversely from the first leg 24. The second leg 26 and the first leg 24 are preferably made from uniform bar stock. The first leg 24 includes a series of notches 28 and 30 on the inside face 32. The spring retractor 20 further includes a first threaded member or rod 34 extending through the second arm 26 with a spacer 36 and an operating handle member 38. The threaded rod 34 terminates with a hook or catch element 40 designed to engage a leg 35, 37 of a U-shaped, brake spring 39.

Further, a threaded eye bolt 44 having an eye 42 at one end of bolt 44 is fitted through a passage 46 in the first arm 24. A handle 48 is threadably attached to the rod 44 so that by turning the handle 48, the rod 44 may be extended or retracted and thus bend or adjust the alignment of the rod 34 which passes through the eye 42. The handle 48 and adjustment mechanism is substantially like that of the handle 38. Further, a spacer 50 is provided and fits around the rod 44 in the same manner as the spacer 36 fits around the rod 34.

An important feature of the invention is the length of the second leg 26. That is, the second leg 26 is adequately long to extend from the first leg 24 or outer periphery or rim of a backing plate 60; namely, from a rim 62 to a hub 64 of the brake assembly 66. The brake assembly 66 is generally positioned about a center line axis 68. The hub 64 is aligned with the axis 68.

In use, a first spring retractor 20 and a second spring retractor 22 are aligned generally along radii from the axis 68 so that a notch, for example, a notch 28 or a notch 30, will engage the backing plate 60 and more particularly the peripheral edge 62 of the backing plate 60. The particular notch which is utilized depends upon the axial spacing between the backing plate 60 and the hub 64. Thus, the choice of notch being used and the arrangement by which the notch is engaged with the backing plate 60 depends upon the particular size and style of the drum brake assembly.

After the notch 28 or 30, as the case may be, is engaged with the backing plate 60, the first leg 24 is in position and the second leg 26 is also generally in a desired position extending over and resting on the hub 64. The hook 40 may then be engaged with a leg 35, 37 of the U-shaped spring. The eye 42 may be utilized to facilitate positioning of the hook 40 for engagement with the spring 39. The handle 38 may then be rotated to cause the hook 40 to withdraw the spring 39 (i.e. legs 35, 37) from a brake shoe. Again, the second handle 48 may also be rotated to facilitate appropriate alignment and movement of the parts. In this manner the spring 39 may be disengaged from the brake shoes 41, 43. Of course, each of the separate spring retractors 20 and 22 are aligned on opposite sides of the hub 64 and thus on opposite sides of the axis 68 to permit engagement of the separate spring retractors 20, 22 with a separate leg 35, 37 of the spring 39. The construction of the hooks 40 may be similar to that described in the prior art patents or as utilized in the prior art commercial embodiments disclosed. However, the present invention is clearly distinct from the prior art inasmuch as the operation thereof requires the utilization of two separate spring retractors 20, 22 used in combination and cooperative with the brake backing plate 60 as well as the hub 64 in order to be appropriately located with respect to the drum brake assembly. Also, the hooks 40 must preferably extend radially outward from axis 68 toward legs 24. This arrangement insures that the spring leg (35, 37) will not disengage from hook 40. The use of the eye bolts 44 is an optional feature of the invention. The eye bolts 44, however, give the construction the capacity and ability to provide for additional adjustment of the positioning of the hook 40 and promote proper engagement with spring 39, i.e. legs 35, 37.

The number of notches, the length of the legs, the configuration or shape of the stock material forming the legs, as well as the manner of formation of the legs may all be varied without departing from the scope of the invention. The particular construction of the hook 40 and the eye elements may also be varied without departing from the scope of the invention. The alignment of the various spring retractors 20, 22 may be generally radial with respect to the axis 68 or off center to a desired degree. Thus, the alignment thereof with respect to the brake drum assembly is not a limiting feature of the invention. Additionally, it is possible to include various passages or openings in the second leg to move the hook member 40 along the length thereof to accommodate the position of various legs of U-shaped spring members. The invention is especially useful with respect to all of those brake spring assemblies depicted in the prior art patents discussed above as well as other brake assemblies, for example, as used in General Motors brand trucks. Thus, while there has been set forth preferred embodiments of the invention, the invention is to be limited only by the following claims and equivalents thereof.

What is claimed is:

1. A method for effecting removal and replacement of a generally U-shaped drum brake spring having first and second spaced each leg in biasing engagement with a brake drum shoe mounted on a brake backing plate, said backing plate having a peripheral edge, a center axis, a hub mounted thereon generally concentric with the center axis, said method comprising the steps of:

providing a spring retraction tool set, said set comprised of first and second spring retractors, each retractor comprising a bracket including a first leg generally for placement parallel to the axis and for engaging the brake backing plate, and a second leg generally transverse to the axis for engaging the hub, a retractable hook member mounted on the second leg for engaging a leg of the spring;

positioning the first leg of each retractor against the backing plate and the second leg against the hub, while aligning the hook member of the first and second retractors respectively with the first and second spring legs for movement thereof in response to actuation of the respective hook members;

retracting the hook members to thereby disengage the spring from the drum brake shoes;

selectively repairing the disconnected drum brake shoes; and subsequently extending the hook members to reverse retraction of the spring and engage the spring with the shoes.

2. The method of claim 1 wherein at least one retractor further includes an adjustable length connector between the first leg and the hook member.

3. The method of claim 1 wherein each retractor includes an adjustable length connector between the first leg and the hook member.

4. The method of claim 3 wherein the first leg includes at least one notch for engaging the backing plate.

5. The method of claim 3 wherein the hook members comprise threaded rods mounted in the second leg and the adjustable length connector comprises a threaded rod mounted in the first leg.

6. The method of claim 1 wherein the legs comprise a uniform dimension bar stock.

7. The method of claim 1 wherein the first leg includes at least one notch for engaging the backing plate.

8. The method of claim 1 wherein the first leg includes a plurality of notches for engaging the backing plate.

9. The method of claim 1 wherein the hook members comprise threaded rods and a turnable nut on said threaded rod.

10. The method of claim 1 wherein the second legs are aligned generally radially from the axis.

11. The method of claim 10 wherein the first and second spring retractors are substantially identical.

12. The method of claim 1 wherein the first and second spring retractors are substantially identical.

13. A brake spring removal and replacement tool comprising, in combination:

a set of first and second spring retractors, each retractor comprising:

a first leg and a second leg extending substantially laterally from the first leg and connected to the first leg;

said first leg including at least an inside face with an alignment element for aligning the first leg in a substantially non-slidable position on a brake backing plates, said alignment element comprising at least one notch in said first leg of said first and second spring retractors, and said second leg elongate and extensible between the first leg and a hub of a drum brake wheel assembly, said second leg further including a spring retractor hook member mounted thereon intermediate the distal end of the second leg and the first leg and extending generally parallel to the first leg, said spring retractor hook member including an attachment element for attachment to a brake spring and a length adjustment mechanism for adjusting the spacing of the attachment element from the second leg.

14. The tool of claim 13 wherein at least one said spring retractor includes an adjustable length connector between the first leg and the spring retractor hook member.

15. The tool of claim 14 wherein the spring retractors are substantially identical.

16. The tool of claim 13 wherein the spring retractors in the set are substantially identical.

17. The tool of claim 13 wherein the first leg and second leg of each retractor are formed from a single bar.

18. The tool of claim 13 wherein the alignment element comprises more than one notch in the first leg of at least one of said spring retractors.

* * * * *